United States Patent
Achar et al.

(10) Patent No.: US 11,486,718 B2
(45) Date of Patent: Nov. 1, 2022

(54) PREDICTING VEHICLE TRAVEL TIME ON ROUTES OF UNBOUNDED LENGTH IN ARTERIAL ROADS

(71) Applicant: Tata Consultancy Services Limited, Mumbai (IN)

(72) Inventors: Avinash Achar, Chennai (IN); Venkatesh Sarangan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 410 days.

(21) Appl. No.: 15/909,566

(22) Filed: Mar. 1, 2018

(65) Prior Publication Data
US 2019/0120637 A1    Apr. 25, 2019

(30) Foreign Application Priority Data
Oct. 25, 2017   (IN) .............................. 201721037803

(51) Int. Cl.
*G08G 1/00*    (2006.01)
*G08G 1/01*    (2006.01)
(Continued)

(52) U.S. Cl.
CPC ....... *G01C 21/3415* (2013.01); *G08G 1/0104* (2013.01); *G08G 1/0112* (2013.01);
(Continued)

(58) Field of Classification Search
CPC ............ G01C 21/3415; G01C 21/3691; G01C 21/3492; G08G 1/20; G08G 1/0104;
(Continued)

(56) References Cited

U.S. PATENT DOCUMENTS

| 5,801,943 A | 9/1998 | Nasburg |
| 7,747,381 B2 | 6/2010 | Adachi |

(Continued)

FOREIGN PATENT DOCUMENTS

| CA | 2 266 208 | 9/2000 |

OTHER PUBLICATIONS

Holfeitner et al., "Arterial travel time forecast with streaming data; A hybrid approach of flow modeling and machine learning", Mar. 23, 2012, Transportation Research at Science Direct (Year: 2012).*

(Continued)

*Primary Examiner* — Jess Whittington
*Assistant Examiner* — Annmarie Dressler
(74) *Attorney, Agent, or Firm* — Finnegan, Henderson, Farabow, Garrett & Dunner, LLP

(57) ABSTRACT

A system and method for predicting travel time of a vehicle on routes of unbounded length within arterial roads. It collects historical information from probe vehicles positions using GPS technology in a periodic fashion and the sequence of links traversed between successive position measurements. Further, it collects information of neighborhood structure for each link within the arterial roads network. Any of the existing conditional probability distribution functions could be used to capture the spatio-temporal dependencies between each link of the arterial network and its neighbors. It learns the parameters of this data driven probabilistic model from historical information of probe vehicle trajectories traversed within the arterial roads network using an associated expectation maximization method. Finally it predicts travel time of vehicles on routes of unbounded length in a novel fashion within the network of arterial roads using the learnt parameters and current real time information of trajectories of vehicle.

12 Claims, 7 Drawing Sheets

(51) Int. Cl.
*G01C 21/34* (2006.01)
*G08G 1/0968* (2006.01)

(52) U.S. Cl.
CPC ......... *G08G 1/0129* (2013.01); *G08G 1/0133* (2013.01); *G08G 1/096805* (2013.01); *G08G 1/20* (2013.01)

(58) Field of Classification Search
CPC ........... G08G 1/096805; G08G 1/0112; G08G 1/0133; G08G 1/0129
See application file for complete search history.

(56) References Cited

U.S. PATENT DOCUMENTS

| | | | |
|---|---|---|---|
| 2006/0287818 A1* | 12/2006 | Okude | G01C 21/3694 701/423 |
| 2011/0035146 A1 | 2/2011 | Guha et al. | |
| 2012/0290204 A1* | 11/2012 | Gueziec | G08G 1/096827 701/533 |
| 2015/0253144 A1* | 9/2015 | Rau | G01C 21/3415 705/348 |

OTHER PUBLICATIONS

Onisko et al., "Learning Bayesian network parameters from small data sets: application of Noisy-Or gates", Mar. 1, 2001, International Journal of Approximate Reasoning 27 (2001) 165-182 (Year: 2001).*

* cited by examiner

PREDICTING VEHICLE TRAVEL TIME ON ROUTES OF UNBOUNDED LENGTH IN ARTERIAL ROADS

PRIORITY CLAIM

This U.S. patent application claims priority under 35 U.S.C. § 119 to India Application No. 201721037803, filed on Oct. 25, 2017. The entire contents of the abovementioned application are incorporated herein by reference.

TECHNICAL FIELD

The embodiments herein generally relates to a system and method for predicting vehicle travel time on routes of unbounded length within a network of the arterial roads and, more particularly, predicting vehicle travel time on routes of unbounded length within the network of the arterial roads by modelling heterogeneous influences between the arterial roads where modelling of spatio-temporal influences between adjacent roads can be flexible.

BACKGROUND

Advances in affordable technologies for sensing and communication have allowed humans to gather data about large distributed infrastructures such as road networks in real-time. The collected data is digested to generate information that is useful for the end users (namely commuters) as well as the road network administrators. Most of this effort falls under broad umbrella of short term traffic forecasting. From the commuters' perspective, travel time is perhaps the most useful information. Predicting travel time along various routes of unbounded length in arterial roads in advance with good accuracy allows commuters to plan their trips appropriately by identifying and avoiding congested roads. Travel time estimation helps transport managers too by helping them identify operational problems such as congestion hot-spots, out-of-sync traffic lights and unhelpful lane directions settings.

Crowd-sourcing based applications allow commuters to predict their travel times along multiple routes. While the prediction accuracy of such applications is reasonable in many instances, they may not be helpful for all vehicles. In certain countries, vehicles larger than cars such as small commercial trucks are restricted to specific lanes with their own different (often lower) speed limit. Hence, the travel times and congestions seen by such vehicles could be different from the values that are predicted from the crowd-sourced data. A variety of data driven techniques to predict travel time have also been proposed based on linear regression, time series models, neural networks, and regression trees to name a few. Most of these methods address prediction in a freeway context. This is mainly because freeways are relatively well instrumented with sensors like loop detectors, AVI detectors, and cameras.

On the other hand, arterial roads have been relatively less studied. A possible reason for this could be the complexities involved in handling traffic lights and intersections. Recently, approaches based on dynamic Bayesian networks (DBN) have also been proposed to predict vehicle travel time on routes of a limited duration (or length) of arterial roads based on sparse probe vehicle data. Under real world traffic conditions, such sophisticated techniques have been shown to significantly outperform other simpler methods.

Existing DBN approaches address the problem of travel time prediction on routes of a limited duration (or length). The existing state-of-the art cannot tackle travel time prediction of unlimited duration (arbitrary routes). In all these approaches, each discrete time step in the DBN corresponds to a (real) fixed time of about 5 minutes to 15 minutes, a time scale at which link congestions evolve. These can meaningfully predict only on routes of duration less than this real fixed time. The present disclosure proposes a system and method which can meaningfully predict travel times of routes of unlimited duration.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for predicting travel time of a vehicle on one or more routes of unbounded length within a network of the arterial roads.

In one aspect, a method for predicting travel time of a vehicle on one or more routes of unbounded length within the network of the arterial roads. The method comprising steps of collecting information of one or more probe vehicle positions using GPS technology over a period of time in a periodic fashion and the sequence of links traversed between successive position measurements, wherein the probe vehicles are plying around the arterial roads network. Further, it collects information of neighborhood structure for each link within the arterial roads network, wherein the information of neighborhood structure for the link includes all its downstream and upstream links. It captures the spatio-temporal dependencies between each link of the network and all its neighbors using a conditional probability distributions. In addition, the method includes process of learning of the parameters of the chosen data driven probabilistic model from collected historical information of probe vehicle trajectories traversed within the arterial roads network using expectation maximization method. Finally it predicts the travel time of the vehicle on one or more routes of unbounded length within the arterial roads using the real time information of the vehicle trajectories that have been recorded from the arterial roads network using GPS technology sensing.

In another aspect, a system for predicting travel time of a vehicle on one or more routes of unbounded length within the networks of the arterial roads. The system comprising a memory with set of instructions and a processor which is configured to execute one or more steps of collecting information of one or more probe vehicle positions using GPS technology over a period of time in a periodic fashion and the sequence of links traversed between successive position measurements, wherein the probe vehicles are plying around the arterial roads network. Further the system collects information of neighborhood structure for each link within the arterial roads network, wherein the information of neighborhood structure for the link includes all its downstream and upstream links. It captures the spatio-temporal dependencies between each link of the network and all its neighbors using a conditional probability distributions. In addition, it learns the parameters of the chosen data driven probabilistic model from collected information of probe vehicle trajectories traversed within the arterial roads network using expectation maximization method. Finally and most importantly, the system predicts the travel time of the vehicle on one or more routes of unbounded length within the network of arterial roads using the real time information of the vehicle trajectories that have been recorded from the arterial roads network using GPS technology sensing.

In another aspect, a non-transitory computer readable medium storing one or more instructions which when executed by a processor on a system, cause the processor to perform method for predicting travel time of a vehicle on one or more routes of unknown length within a network of the arterial roads. The one or more instructions comprising one or more steps of collecting information of one or more probe vehicle positions using GPS technology over a period of time in a periodic fashion and the sequence of links traversed between successive position measurements, wherein the probe vehicles are plying around the arterial roads network. Further, it collects information of neighborhood structure for each link within the arterial roads network, wherein the information of neighborhood structure for the link includes all its downstream and upstream links. It captures the spatio-temporal dependencies between each link of the network and all its neighbors using a conditional probability distributions. In addition, the method includes process of learning of the parameters of the chosen data driven probabilistic model from collected historical information of probe vehicle trajectories traversed within the arterial roads network using expectation maximization method. Finally it predicts the travel time of the vehicle on one or more routes of unbounded length within the arterial roads using the real time information of the vehicle trajectories that have been recorded from the arterial roads network using GPS technology sensing.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
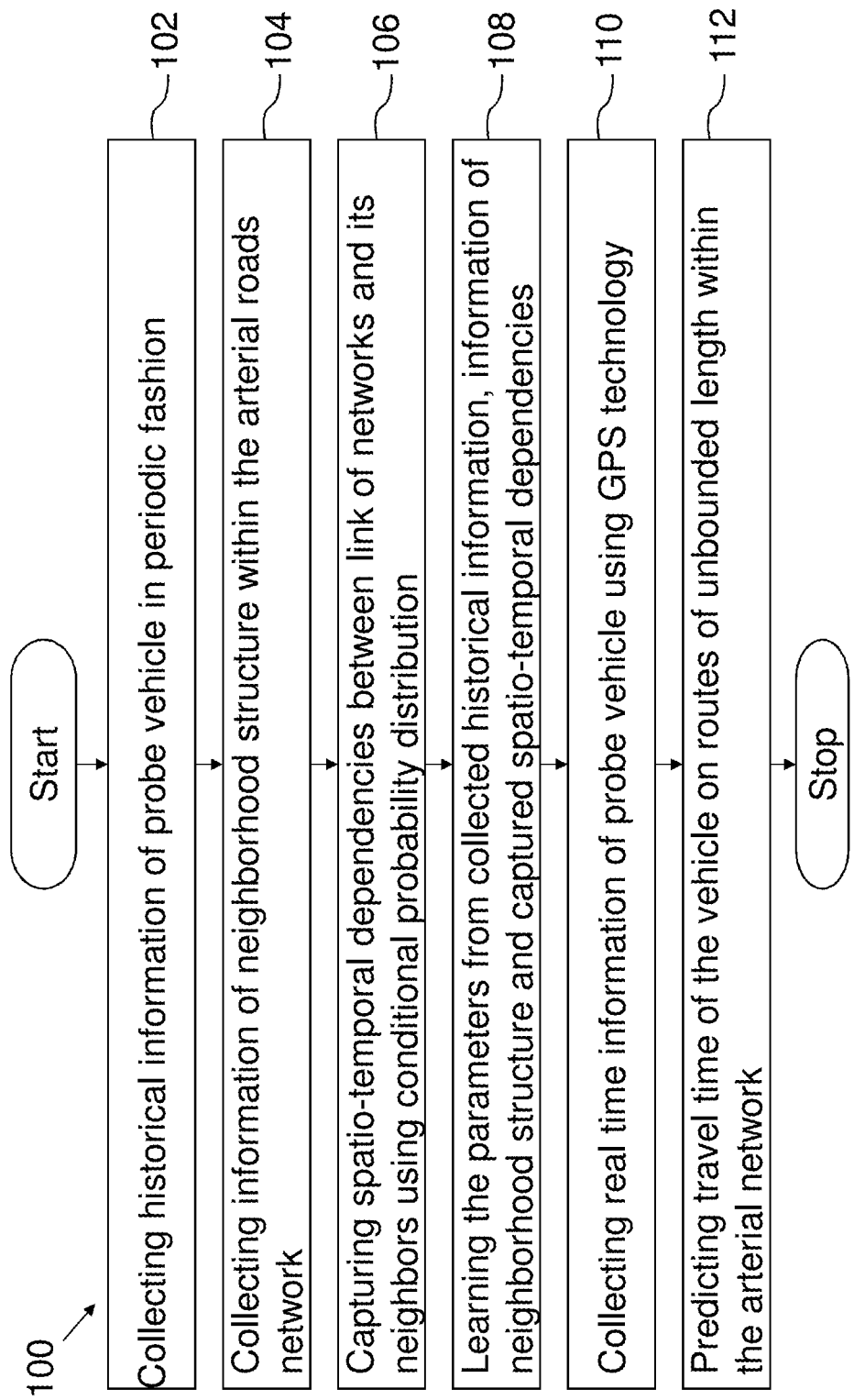
FIG. 1 illustrates a method for predicting travel time of a vehicle on one or more routes of unbounded length within the network of arterial roads according to an embodiment of the present disclosure.

Referring FIG. 1, a method 100 for predicting travel time of a vehicle on one or more routes of unbounded length within a network of arterial roads. It would be appreciated that the travel time of a vehicle on the one or more routes of unbounded length can be read as the travel time of a vehicle on the one or more routes of unrestricted duration interchangeably.

At the step 102, where the process collects information of one or more probe vehicle positions using GPS technology over a period of time in a periodic fashion and the sequence of links traversed between successive positions. It would be appreciated that the collected information of one or more probe vehicle positions over a period of time includes historical information of the one or more probe vehicle trajectories which has been recorded over a period of time. The one or more probe vehicles are plying around the network of the arterial roads. The one or more probe vehicles are enabled with GPS technology, for instance could be regular cabs from a cab service or a regular commuters with a smart phone based or dedicated GPS sensing. The one or more probe vehicles act as a data source for observing the network's condition. These vehicles are assumed to send their GPS co-ordinates in a periodic fashion.

At the step 104, where the process collects information of neighbourhood structure for each link of one or more links of the network of the arterial roads. The collected information of neighbourhood structure for the link includes downstream links and upstream links of the route.

At the step 106, where the process captures the spatio-temporal dependencies between each link of the network of the arterial roads and all its neighbors using a conditional probability distributions. It should be noted that for illustration purpose NoisyOR conditional probability distribution is being used in the present disclosure. Thus, it would be appreciated that any of the existing conditional probability distributions can be used for modelling the state transitions of DBN. Herein, the arterial traffic is modelled as a discrete-time dynamical system and at each time step, each link of the network is assumed to be in one of two states namely, congested or uncongested.

Figure 2:
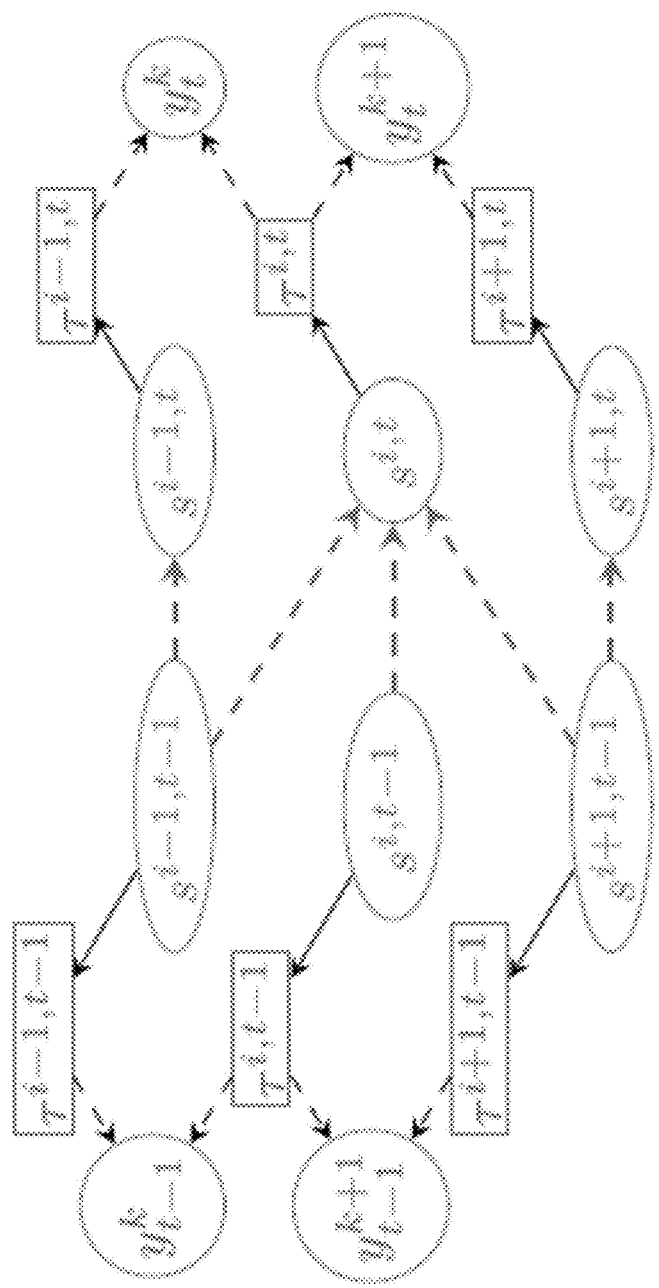
FIG. 2 is a schematic diagram of two time-slice Bayesian net structure according to an embodiment of the present disclosure.

Referring FIG. 2, which shows the structure of the utilized Dynamic Bayesian Network (DBN), wherein at time step t, a link $i \in l$ in the network is assumed to be in one of two states congested (1) and uncongested (0). The set of roads $\pi i$ are adjacent to the arterial road i including itself. The adjacent structure of the road network is utilized to obtain the transition structure of the DBN from time step t to time t+1. Specifically, the state of link i at time t+1 is assumed to be a function of the state of all its neighbor $\pi^i$ at time t. In the DBN structure, this implies that the node corresponding to the link i at time t+1 will have incoming edge from nodes in $\pi^i$ at time t. The traversal time on a trajectory is a sum of random variables, each representing the travel time of a link of the path. It is noted that the travel time on a link to be a random variable whose distribution depends on the state of the respective link. From the structure of DBN given the state information of the underlying links, these link travel times are independent. Hence the conditional travel time on a path is sum of independent random variables.

At the step 108, where the process provides learning of one or more parameters of a data driven probabilistic model using expectation maximization method. The learning of the one or more parameters is based on the collected historical information of the trajectories of the one or more probe vehicle traversed within the network of the arterial roads over a period of time, the information of neighborhood structure of each link and captured spatio-temporal dependencies between each link of the network of the arterial roads. It would be appreciated that the data driven probabilistic model is a Dynamic Bayesian Network (DBN). There are two types of conditional probability distributions (CPD) possible on the DBN namely observation CPD and transition CPD.

In the preferred embodiment, the observation CPD governs the observations given the current state of the links. If the travel time distribution on a link i given its state s, it is assumed that the observation is to be normally distributed with parameters $\mu^{i,s}$ and $\sigma^{i,s}$. Herein, it can be compactly referred to these observation parameters as ($\mu$, $\sigma$). The travel time measurement from the $k^{th}$ vehicle at time epoch t, $y_{t,k}$ is specified by the set of links traversed $L_t$ (k) and the position of the start and end coordinates on the first and last links (namely $x^k_{s,t}$ and $x^k_{e,t}$ respectively). Further wherein, $f(y^k_t|s^{L_t(k),t}, x^k_{s,t}, x^k_{e,t})$ denotes the conditional distribution of a travel time measurement, conditioned on the links traversed and the start-end positions.

In the preferred embodiment, a NoisyOR CPD based transition structure is being used for modelling the state transition of DBN, It should be noted that a variety of CPDs can be used for modelling the state transitions of DBN. For illustration purpose only the NoisyOR CPD based transition structure is used and defined as below.

$$P(Y = 0 | X) = q_0 \prod_{k=0}^{n} q_k^{X_k}, X_k \in \{0, 1\}$$

wherein if Y,Y$\in$ {0, 1} is the output and X=($X_1$, $X_2$ ... $X_n$), $X_k \in$ {0, 1} is the input then the NoisyOR CPD is parameterized by n+1 parameters, ($q_0$, $q_1$, $q_2$ ... $q_n$)$\leq q_i \leq 1$. An equivalent representation of the NoisyOR CPD useful for learning is given in FIG. 3.

At the step 110, the process collects real time information of trajectories of one or more probe vehicles using the GPS technology.

At the last step 112, the process predicts travel time of the vehicle on one or more routes of unbounded length within the network of arterial roads based on an exploiting particle filtering using a real time information of trajectories of the one or more probe vehicles and the one or more learnt parameters of the data driven probabilistic model.

Figure 4:
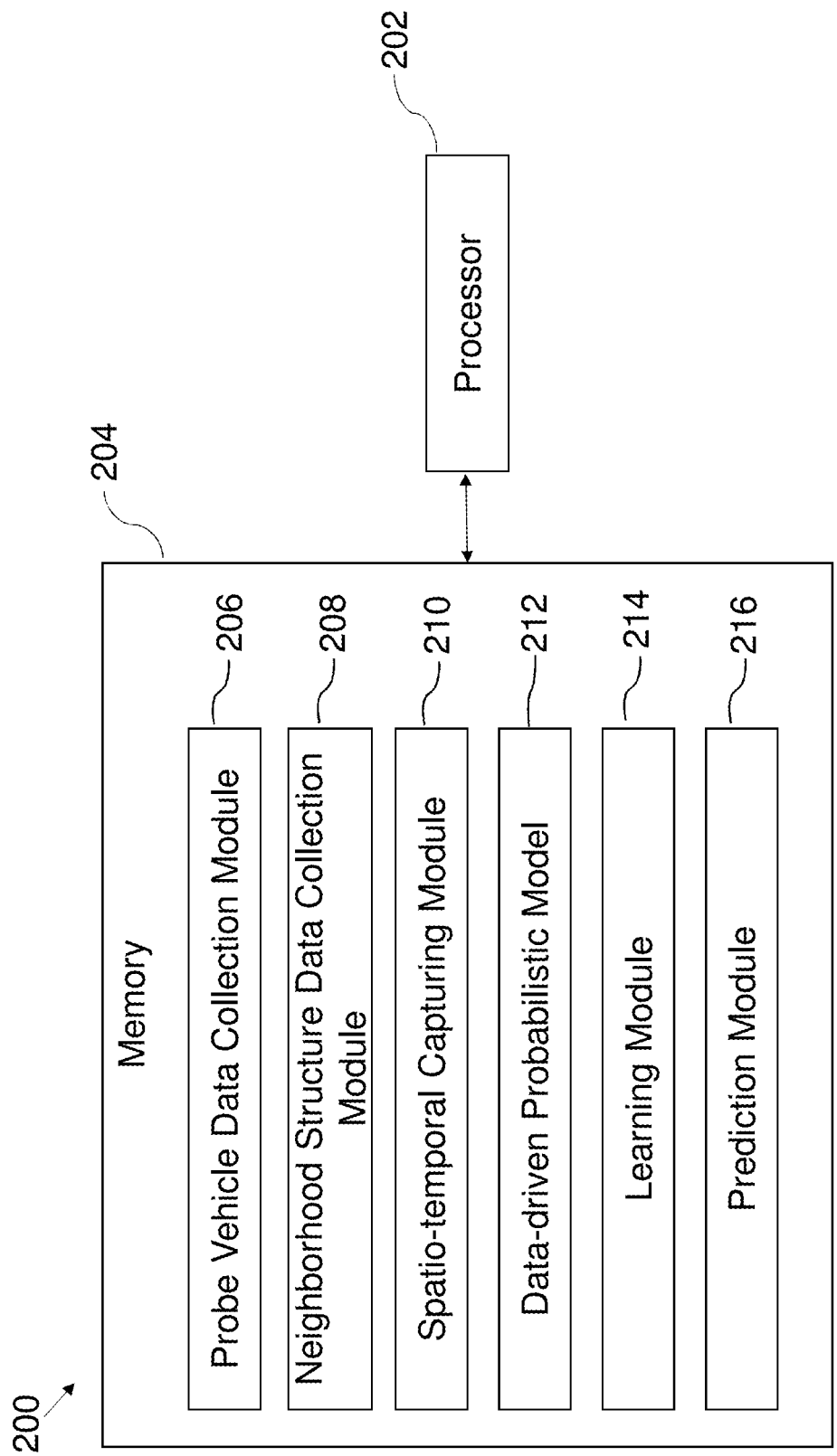
FIG. 4 illustrates a system for predicting travel time of a vehicle on one or more routes of unbounded length within the network of arterial roads according to an embodiment of the present disclosure.

Referring FIG. 4, a system 200 for predicting travel time of a vehicle on one or more routes of unbounded length within the network of the arterial roads. The system 200 comprising a processor 202, a memory 204 communicatively coupled to the processor 202 a plurality of probe vehicle data collection module 206, a neighborhood structure data collection module 208, a spatio-temporal capturing module 210, a data-driven probabilistic model 212, a learning module 214, and a prediction module 216.

In the preferred embodiment, the plurality of probe vehicle data collection module 206 is configured to collect information of trajectories of one or more probe vehicles in a periodic fashion using GPS technology over a period of time. The one or more probe vehicles are plying around the network of the arterial roads. The sequence of links traversed between successive position measurements is computed using a shortest path algorithm (for instance) on an equivalent graph. Each node in this graph corresponds to a link in the network of arterial roads, a directed edge in this graph is from an upstream link to a downstream neighboring link. The neighborhood structure needed here is provided by the neighborhood structure data collection module 208. It would be noted that the probe vehicle data collection module also collects real time information of trajectories of one or more probe vehicles.

Further, the neighborhood structure data collection module 208 of the system is configured to collect information of neighborhood structure for each link of the network of the arterial roads. The collected information of neighborhood structure for a link of the network includes its downstream links and upstream links.

In the preferred embodiment, the spatio-temporal capturing module 210 of the system 200 is flexible and is configured to capture the spatio-temporal dependencies between each link of the network of the arterial road using any of the existing transition CPDs.

In the preferred embodiment, the learning module 214 is configured to learn the parameters of the data-driven probabilistic model 212 from the collected information of trajectories of the one or more probe vehicle traversed within the network of the arterial roads over a period of time using expectation maximization method. The learning procedure is an iterative process called an Expectation Maximization (EM) algorithm which involves two steps at each iteration. The expectation step (E-step) involves computing a suitable Expected Sufficient Statistic (ESS) given the current set of parameters. The ESS computation is accomplished in an approximate fashion using a specific stochastic sampling based technique called particle filtering. As the particles are grown, the current underlying NoisyOR (or any other existing) transition probability structure is utilized to grow the particles.

In the preferred embodiment, the prediction module 216 of the system 200 predicts travel time of the vehicle on one or more routes of unbounded length within the network of the arterial roads based on an exploiting particle filtering. The prediction module 216 predicts the travel time using the real time information of trajectories of one or more probe vehicles and the one or more learnt parameters of the data driven probabilistic model.

In one embodiment, wherein one or more parameters of learnt parameters of a transition CPD and an observation CPD are used to train DBN for predicting the travel time of the vehicle on a route of unbounded length. Further wherein, the vehicle traverses a query trajectory $\Gamma=[i_1, i_2, \ldots i_{|\Gamma|}]$ starting at t$\Delta$ (from time bin (t+1)). It would be noted that the probe vehicle positions are sampled every $\Delta$ min. This would mean from the model perspective that the real time is discretised into time bins (epochs or steps) of uniform size $\Delta$. Usually the query trajectory $\Gamma$ is lesser than $\Delta$ but herein the query trajectory $\Gamma$ can be more than $\Delta$. The query trajectory $\Gamma$ is segmented starting from its beginning in such a way that the expected travel time of every segment except the last is exactly $\Delta$. Further, it would be noted that the method essentially exploits the temporal structure of the underlying dynamic Bayesian network.

In an example, wherein let $x_s$ be start position of the trajectory $\Gamma$ in link $i_1$ and let $d_1$ be the distance from $x_s$ to end of $i_1$ along $\Gamma$. Further, herein it is assumed that the end point $x_e$ of $\Gamma$ coincides with the end of link $i_{|\Gamma|}$. Given the sub-path $L=[i_1, i_2 \ldots i_l]$, $1 \le |\Gamma|$, the travel time distribution along L is a mixture of Gaussians. The number of components in the mixture would be $2^l$, with each component weight being P $(s^{L, t+1}=b|y^t, \theta)$, where b is a binary string of length l that encodes the states of the individual links. Each associated component distribution of the mixture will itself be a sum of independent Gaussians with a mean of $\Sigma^l_{j=1} \mu^i_j$, b (j). For any prefix subpath of length l ($L=[i_1, i_2 \ldots i_l]$, $1 \le |\Gamma|$), let two $2^l$ length vectors $M_l$ and $p_l$. $M_l$ denotes the mean vector of all the components of the Gaussian mixture distribution modelling the travel time across L. Specifically $$M_l(k) = \alpha_s \mu^{i1, b_{k-1}(1)} + \Sigma_{j=2}^{|L|} \mu^{i_j, b_{k-1}(j)}$$

where $\alpha_s = d_1/\text{len}(i_1)$ and $b_k$ is l-length binary representation of integer k. Similarly, $p_l$ is the vector of mixture weights of this Gaussian mixture where $$p_l(k) = P(s^{L, t+1} = b_{k-1}|y^t, \theta^*).$$

Further, reweighted particles already spawned till time t (using particle filtering) are now grown by one step to compute each of the components of $p_l$. The mean travel time across any prefix length L will be $p^T_l M_l$. For the smallest index c that satisfies $p^T_c M_c > \Delta$ using herein a binary search. In the binary search for the first link $i_c$ along the trajectory $\Gamma$ where the mean travel time from $x_s$ becomes greater than $\Delta$. After finding $i_c$ herein, the precise location $x_c$ on the link $i_c$ such that the mean travel time from $x_s$ to this point equals $\Delta$. Interestingly, this point $x_c$ can be determined using a closed form expression. Let $d_c$ be the distance of $x_c$ from the beginning of $i_c$ than $\alpha_c = d_c/\text{len}(i_c)$ wherein $$\alpha_c = \Delta - p_c^T M_c^-)/p_c^T M_c^e$$

where $M^e_c = [\mu^{ic,1}, \mu^{ic,1}, \mu^{ic,0}, \mu^{ic,1} \ldots \mu^{ic,1}]^T$ and $$M_c^{e-}(k) = \alpha_s \mu^{i1, b_{k-1}(1)} + \sum_{j=1}^{c} \mu^{i_j, b_{k-1}(j)}$$

Now $\alpha^* \text{len}(i_c)$ gives the position on $i_c$ that defines the end of first segment of $\Gamma$ consuming $\Delta$ units of time. The process of segmenting is continued on the remaining path with the end of the first segment as the new start position. All the particles currently at (t+1) are grown by one stop as per the chosen state transition structure and the process continues. The process terminates with the last segment which consumes a time less than or equal to $\Delta$. The sum of the times consumed by each segment gives the total mean travel time of the path $\Gamma$.

Figure 5:
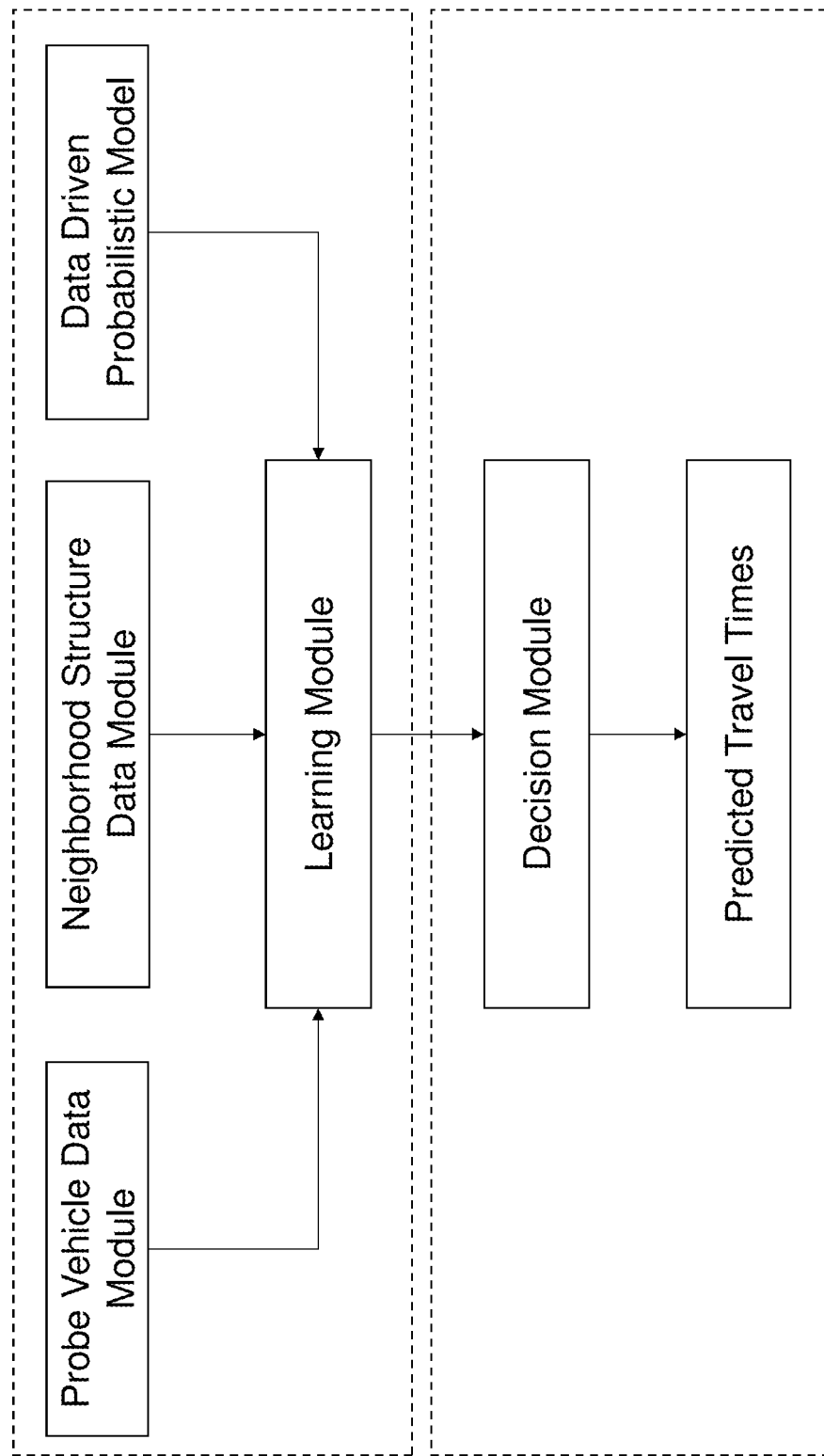
FIG. 5 is a schematic diagram for predicting travel time of a vehicle on one or more routes of unbounded length within the network of arterial roads according to an embodiment of the present disclosure.

Referring FIG. 5, wherein it predicts travel time of a vehicle on one or more routes of unbounded length within the network of the arterial roads. Predicting travel time of the vehicle on the one or more routes within arterial roads is a very useful and tangible quantity of interest in the context of intelligent transportation systems. The system receives information of one or more probe vehicle positions as data inputs in a period fashion from probe vehicles data module. It would be noted that the periodic fashion is defined as a pre-defined time interval.

Figure 3:
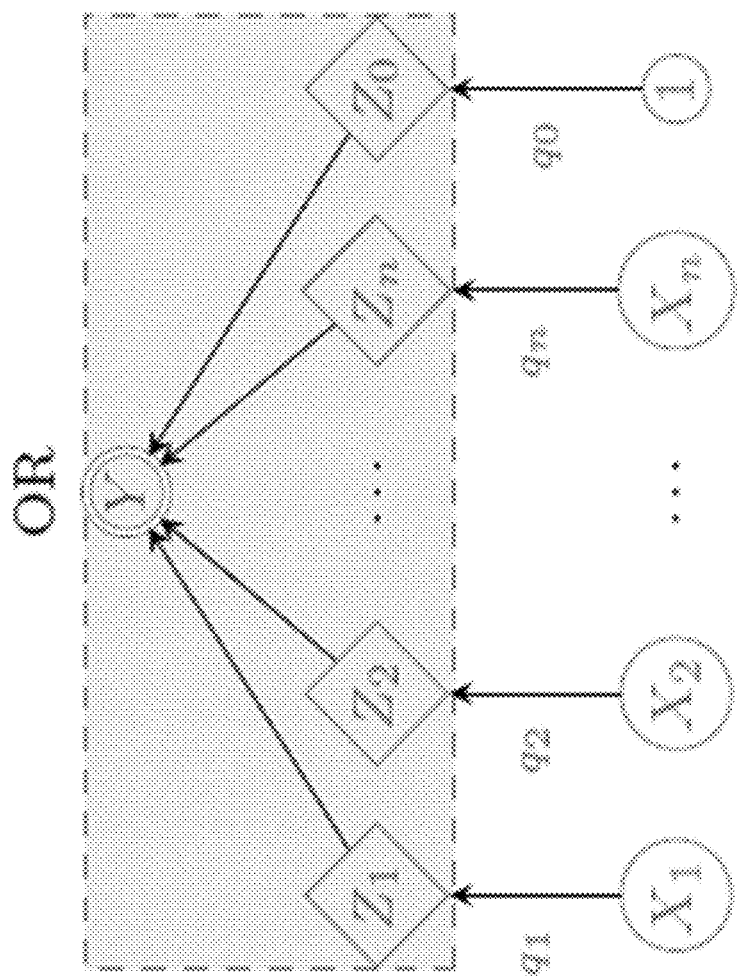
FIG. 3 is a schematic diagram for proposed model for the DBN's transition conditional probability distribution according to an embodiment of the present disclosure.

In one embodiment, as an example, a synthetic data generator is fed with a road network containing certain links along with their lengths and a neighborhood structure as shown in FIG. 3. Based on this neighborhood structure the system feeds the generator a transition probability structure governing the congestion state transitions of individual links from time t to time t+1. The conditional travel times for each link i and state_s, is assumed to be normally distributed with appropriate parameters $\mu^i$, s and $\sigma^i$, s. The $\mu^i$, 0 and $\mu^i$, 1 capture the average travel times experienced by commuters during congestion and non-congestion due to intersections or traffic lights. The $\sigma$ parameter captures the continuum of congestion levels actually possible. The link states are assumed to make transition at a time scale approximately equal to $\Delta$. In addition, the paths and vehicles are so chosen that there is sufficient coverage of all the links across space and time. The link states that are stochastically sampled with time as per prefixed transition probability structure. Given the state of all the links at a particular time epoch, the idea of probe vehicle trajectory generation is as follows. If a vehicle is at a position xs at the start of a time epoch of $\Delta$, then the idea is to exhaust these A units of time along the (prefixed) path of the vehicle and arrive at an appropriated end position based on the conditional normal travel times at each link.

Figure 6:
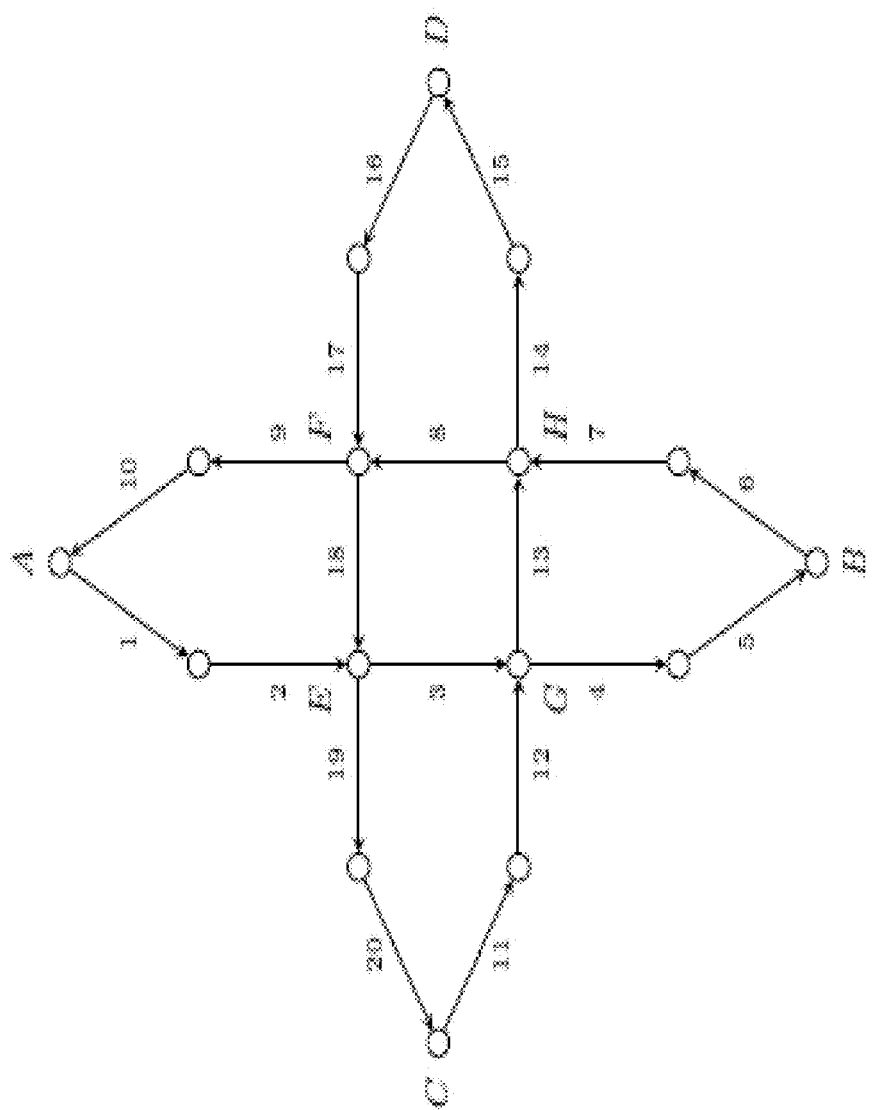
FIG. 6 is a schematic diagram of a network structure consists of 20 links according to an embodiment of the present disclosure.

Referring FIG. 6, as an example, a short-lived congestion is embedded herein which can randomly originate at either link 1, 6, 11 or 16. Once congestion starts at link 1, it moves downstream to link 2 with probability 1 at the next time step and this process continues unidirectionally till link 5. A similar congestion pattern which moves downstream one link at a time at every subsequent time step is embedded starting from link 6, 11 and 16. Congestion doesn't persist in the same link into the next time step in any of the links as these are short-lived congestions. Such short-lived congestion happens in real-world when a wave of vehicles traverse the links. Further, it also generates data where congestion at a link can persist for multiple time ticks. It is to be noted that both short-lived and long-lived congestions can be elegantly modelled using a NoisyOR based data generator.

Figure 7:
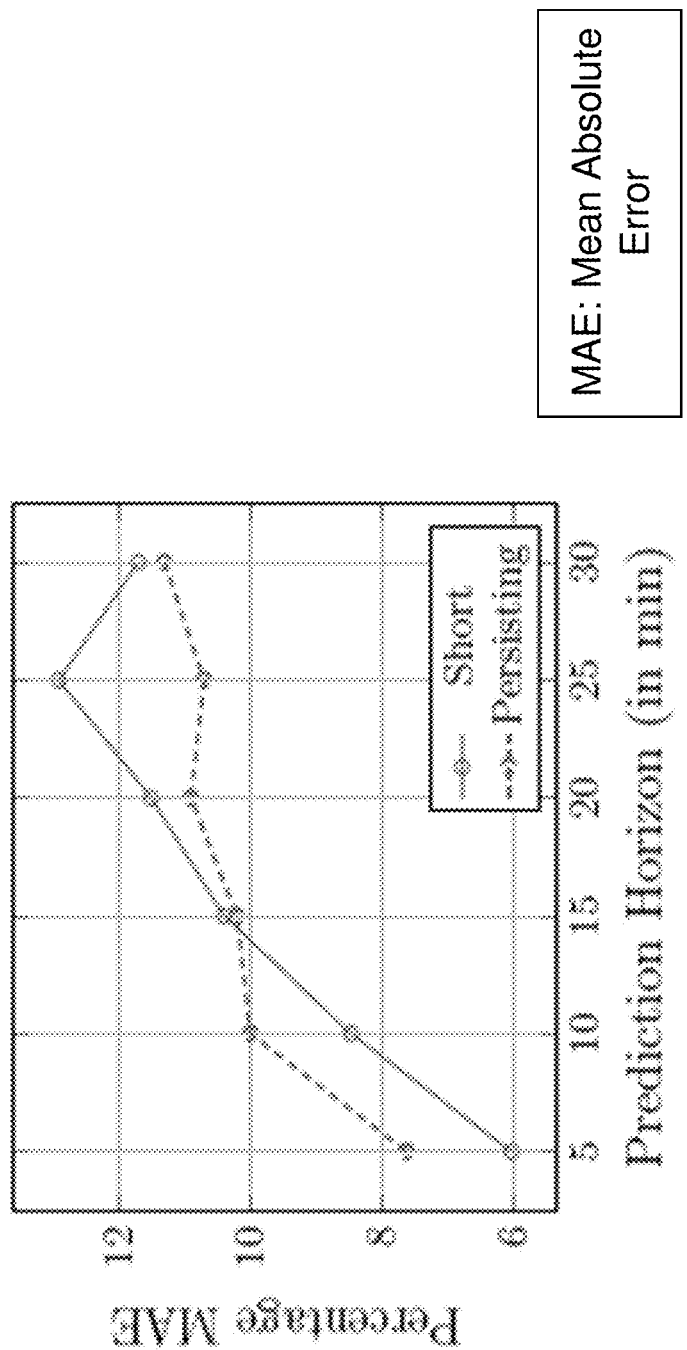
FIG. 7 is a schematic diagram to plot the prediction error averaged across all the distinct randomly chosen trips for various trip times according to an embodiment of the present disclosure.

Referring FIG. 7, wherein it shows plots the prediction error of a trip duration. It shows the absolute error averaged across all the distinct randomly chosen trips for various true (observed) trip times. For very short prediction intervals, (<15 minutes), the error in travel time prediction is quite less (10 minutes). As the true trip time or the prediction horizon of the chosen trajectories is increased, the Mean Absolute Error (MAE) also increases as intuitively expected. Under persisting congestion, we find that for increasing prediction intervals, the prediction error does not increase as much as in the short-lived congestion scenario. Overall it shows that the MAE is reasonable even for trips upto 30 minutes duration both under short-lived and persisting congestions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for predicting travel time of a vehicle on one or more routes of unbounded length within a network of the arterial roads. The process collects historical information of one or more probe vehicle positions using GPS technology over a period of time in a periodic fashion and the sequence of links traversed between successive position measurements via map-matching or shortest-path techniques. Further, the process collects information of neighborhood structure for each link within the arterial roads network. A NoisyOR conditional probability distribution functions is used to capture the spatio-temporal dependencies between each link of the arterial network and its neighbors. It learns the parameters of a data driven probabilistic model from collected historical information of probe vehicle trajectories traversed within the arterial roads network using expectation maximization method and finally the process predicts travel time of the vehicle (using particle filtering) in a novel fashion on one or more routes within the arterial roads using the real time information of the trajectories of the one or more probe vehicles that have been recorded from the arterial roads network using GPS technology sensing and the one or more learnt parameters of data driven probabilistic model.

The embodiments of present disclosure herein addresses unresolved problem to predict travel times of a vehicle if the road condition seen by the vehicle is different from the average conditions. While the existing state-of-art is reasonable in many instances in predicting travel times but they may not be helpful for all vehicles. For instance, in certain countries there are vehicles larger than cars and they are restricted to specific lanes with their own different speed limit. Hence the travel times and congestions seen by such vehicles could be different from the values that are predicted from the existing state of art applications.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for predicting a travel time of a vehicle on a trajectory consisting of one or more links of unbounded length within a network of the arterial roads, the method comprising:
   collecting information of trajectories of one or more probe vehicles periodically using Global Positioning System (GPS) technology over a period of time, wherein the one or more probe vehicles are plying around the network of the arterial roads and the network of arterial roads having one or more links;

collecting information of neighborhood structure for each link of the one or more links of the network of the arterial roads, wherein the information of neighborhood structure for the link includes information on downstream links and upstream links of the link;

capturing spatio-temporal dependencies between each link and its neighbors of the network of the arterial roads using a transition conditional probability distribution (CPD), wherein the captured spatio-temporal dependencies are modelled as a discrete-time dynamical system and at each time step (t), a link of the network of the arterial roads is represented by a state as congested or uncongested in a Dynamic Bayesian Network (DBN) model as a data-driven probabilistic model;

learning one or more parameters of the data-driven probabilistic model using an expectation maximization method, wherein the learning of the one or more parameters is based on the collected information of the trajectories of the one or more probe vehicles traversed within the network of the arterial roads, the information of neighborhood structure of each link and the captured spatio-temporal dependencies between each link of the network of the arterial roads;

collecting real time information of trajectories of the one or more probe vehicles using the GPS technology and generating synthetic data based on a road network containing links along with corresponding lengths, the neighborhood structure, and the transition CPD governing congestion state transitions of individual links at each time step; and predicting the travel time of the vehicle on the trajectory consisting of the one or more links of the unbounded length within the network of the arterial roads using the real time information of trajectories of the one or more probe vehicles, the one or more learnt parameters of the data-driven probabilistic model and a particle filtering technique, wherein the one or more learnt parameters are parameters of the transition CPD and of an observation CPD and are used for predicting travel time of the vehicle on a trajectory along a route of the unbounded length using a temporal structure of the DBN, wherein the prediction of travel time comprises of:

sequentially segmenting the trajectory of the vehicle starting from its beginning in such a way that an expected travel time of every segment except last segment is exactly $\Delta$ units of time, wherein the $\Delta$ units of time is the rate at which the state of each link of the network of the arterial roads transitions from one state to another, and determining a travel time distribution as a mixture of Gaussians and the number of components in the mixture of Gaussians is based on the length of the trajectory, and each component's probability weight is based on the state of individual links, and particles from the particle filtering technique are grown by one step to compute a vector of mixture weights of the mixture of Gaussians;

continuing the process of segmenting on a remaining trajectory with the end of a first segment as a new start position, and all particles are grown by one step and terminating the process of segmenting with a last segment consuming a time less than $\Delta$ units of time; and adding the travel time consumed by each segment to get a total mean travel time of the vehicle is expected to travel along the trajectory.

2. The method claimed in claim 1, wherein the one or more probe vehicles are vehicles comprising the GPS technology.

3. The method claimed in claim 1, wherein the one or more probe vehicles include one or more cabs from a cab service provider and one or more commuters having the GPS technology for periodically collecting the information of the trajectories.

4. The method claimed in claim 1, wherein collecting information of the trajectories of the one or more probe vehicles includes collecting information of sequence of the one or more links traversed between successive positions of the one or more probe vehicles.

5. The method claimed in claim 1, wherein the information of neighborhood structure for each link of the network of the arterial roads is used to capture congestion correlation in a spatio-temporal manner.

6. The method claimed in claim 1, wherein the condition probability distribution is used to model the spatio-temporal dependencies of the data-driven probabilistic model.

7. A system for predicting travel time of a vehicle on a trajectory consisting of one or more links of unbounded length within a network of arterial roads, the system comprising:

a memory with a set of instructions a processor communicatively coupled with the memory;

a plurality of probe vehicle data collection module, coupled to the processor, configured to collect information of trajectories of one or more probe vehicles periodically using Global Positioning System (GPS) technology over a period of time, wherein the one or more probe vehicles are plying around the network of the arterial roads and the network of arterial roads having one or more links a neighborhood structure data collection module, coupled to the processor, configured to collect information of neighborhood structure for each link of the one or more links of the network of the arterial roads, wherein the information of neighborhood structure for the link includes information on downstream links and upstream links of the link;

a spatio-temporal capturing module, coupled to the processor, configured to capture spatio-temporal dependencies between each link and its neighbors of the network of the arterial roads using a transition conditional probability distribution (CPD), wherein the captured spatio-temporal dependencies are modelled as a discrete-time dynamical system and at each time step (t), a link of the network of the arterial roads is represented by a state as congested or uncongested in a Dynamic Bayesian Network (DBN) model as a data-driven probabilistic model;

a learning module, coupled to the processor, configured to learn one or more parameters of the data-driven probabilistic model using an expectation maximization method, wherein the learning of the one or more parameters is based on the collected information of the trajectories of the one or more probe vehicles traversed within the network of the arterial roads, the information of neighborhood structure of each link and the captured spatio-temporal dependencies between each link of the network of the arterial roads;
a probe vehicle data collection module, coupled to the processor, configured to collect real time information of trajectories of the one or more probe vehicles using the GPS technology and generating synthetic data based on a road network containing links along with corresponding lengths, the neighborhood structure, and the transition CPD governing congestion state transitions of individual links at each time step; and
a prediction module, coupled to the processor, configured to predict the travel time of the vehicle on the trajectory consisting of the one or more links of the unbounded length within the network of the arterial roads using the real time information of trajectories of the one or more probe vehicles, the one or more learnt parameters of the data-driven probabilistic model and a particle filtering technique, wherein the one or more learnt parameters are parameters of the transition CPD and of an observation CPD and are used for predicting travel time of the vehicle on a trajectory along a route of the unbounded length using a temporal structure of the DBN, the prediction module is further configured to:
sequentially segmenting the trajectory of the vehicle starting from its beginning in such a way that an expected travel time of every segment except last segment is exactly $\Delta$ units of time, wherein the $\Delta$ units of time is the rate at which the state of each link of the network of the arterial roads transitions from one state to another, and determining a travel time distribution as a mixture of Gaussians and the number of components in the mixture of Gaussians is based on the length of the trajectory, and each component's probability weight is based on the state of individual links, and particles from the particle filtering technique are grown by one step to compute a vector of mixture weights of the mixture of Gaussians;
continuing the process of segmenting on a remaining trajectory with the end of a first segment as a new start position, and all particles are grown by one step and terminating the process of segmenting with a last segment consuming a time less than $\Delta$ units of time; and
add the travel time consumed by each segment to get a total mean travel time of the vehicle is expected to travel along the trajectory.

8. The system claimed in claim 7, wherein the one or more vehicles are vehicles comprising the GPS technology.

9. The system claimed in claim 7, wherein the one or more probe vehicles include one or more cabs from a cab service provider and one or more commuters having the GPS technology for periodically collecting the information of the trajectories.

10. The system claimed in claim 7, wherein the information of neighborhood structure for each link of the network of the arterial roads is used to capture congestion correlation in a spatio-temporal manner.

11. A non-transitory computer readable medium storing one or more instructions which when executed by a processor on a system, cause the processor to perform method for predicting travel time of a vehicle on a trajectory consisting of one or more links of unbounded length within a network of the arterial roads, wherein the one or more instructions comprising:
collecting information of trajectories of one or more probe vehicles periodically using Global Positioning System (GPS) technology over a period of time, wherein the one or more probe vehicles are plying around the network of the arterial roads and the network of arterial roads having one or more links;
collecting information of neighborhood structure for each link of the one or more links of the network of the arterial roads, wherein the information of neighborhood structure for the link includes information on downstream links and upstream links of the link;
capturing spatio-temporal dependencies between each link and its neighbors of the network of the arterial roads using a transition conditional probability distribution (CPD), wherein the captured spatio-temporal dependencies are modelled as a discrete-time dynamical system and at each time step (t), a link of the network of the arterial roads is represented by a state as congested or uncongested in a Dynamic Bayesian Network (DBN) model as a data- driven probabilistic model;
learning one or more parameters of the data-driven probabilistic model using an expectation maximization method, wherein the learning of the one or more parameters is based on the collected information of the trajectories of the one or more probe vehicles traversed within the network of the arterial roads, the information of neighborhood structure of each link and the captured spatio-temporal dependencies between each link of the network of the arterial roads;
collecting real time information of trajectories of the one or more probe vehicles using the GPS technology and generating synthetic data based on a road network containing links along with corresponding lengths, the neighborhood structure, and the transition CPD governing congestion state transitions of individual links at each time step; and
predicting the travel time of the vehicle on the trajectory consisting of the one or more links of the unbounded length within the network of the arterial roads using the real time information of trajectories of the one or more probe vehicles, the one or more learnt parameters of the data-driven probabilistic model and a particle filtering technique, wherein the one or more learnt parameters are parameters of the transition CPD and of an observation CPD and are used for predicting travel time of the vehicle on a trajectory along a route of the unbounded length using a temporal structure of the DBN, wherein the prediction of travel time comprises of:
sequentially segmenting the trajectory of the vehicle starting from its beginning in such a way that an expected travel time of every segment except last segment is exactly $\Delta$ units of time, wherein the $\Delta$ units of time is the rate at which the state of each link of the network of the arterial roads transitions from one state to another, and determining a travel time distribution as a mixture of Gaussians and the number of components in the mixture of Gaussians is based on the length of the trajectory, and each component's probability weight is based on the state of individual links, and particles from the particle filtering technique are grown by one step to compute a vector of mixture weights of the mixture of Gaussians;
continuing the process of segmenting on a remaining trajectory with the end of a first segment as a new start position, and all particles are grown by one step and terminating the process of segmenting with a last segment consuming a time less than $\Delta$ units of time; and adding the travel time consumed by each segment to get a total mean travel time of the vehicle is expected to travel along the trajectory.

12. The non-transitory computer readable medium of claim 11, wherein collecting information of the trajectories of the one or more probe vehicles includes collecting information of sequence of the one or more links traversed between successive positions of the one or more probe vehicles.

* * * * *